United States Patent [19]

Baugh

[11] 4,201,238

[45] May 6, 1980

[54] EMERGENCY OVERRIDE WITH HERMETIC SEAL

[75] Inventor: Benton F. Baugh, Houston, Tex.

[73] Assignee: Vetco, Inc., Ventura, Calif.

[21] Appl. No.: 885,476

[22] Filed: Mar. 13, 1978

[51] Int. Cl.² .................... F01B 7/00; F16K 31/143
[52] U.S. Cl. ................................. 137/68 R; 91/510; 92/62; 92/152; 251/63.4
[58] Field of Search ............... 137/68 R, 68 A, 797; 251/62, 63.4; 91/510; 92/62, 152

[56] References Cited

U.S. PATENT DOCUMENTS

| 3,570,804 | 3/1971 | Nelson et al. | 251/63.4 X |
| 3,734,455 | 5/1973 | Natho et al. | 251/62 |
| 3,889,922 | 6/1975 | Peters | 251/14 |

Primary Examiner—Martin P. Schwadron
Assistant Examiner—Richard Gerard
Attorney, Agent, or Firm—Pravel, Gambrell, Hewitt, Kirk, Kimball & Dodge

[57] ABSTRACT

A hydraulically actuated gate valve having a hermetically sealed piston head adapted to receive a remotely operable actuator for overriding the valve to open the gate.

3 Claims, 2 Drawing Figures

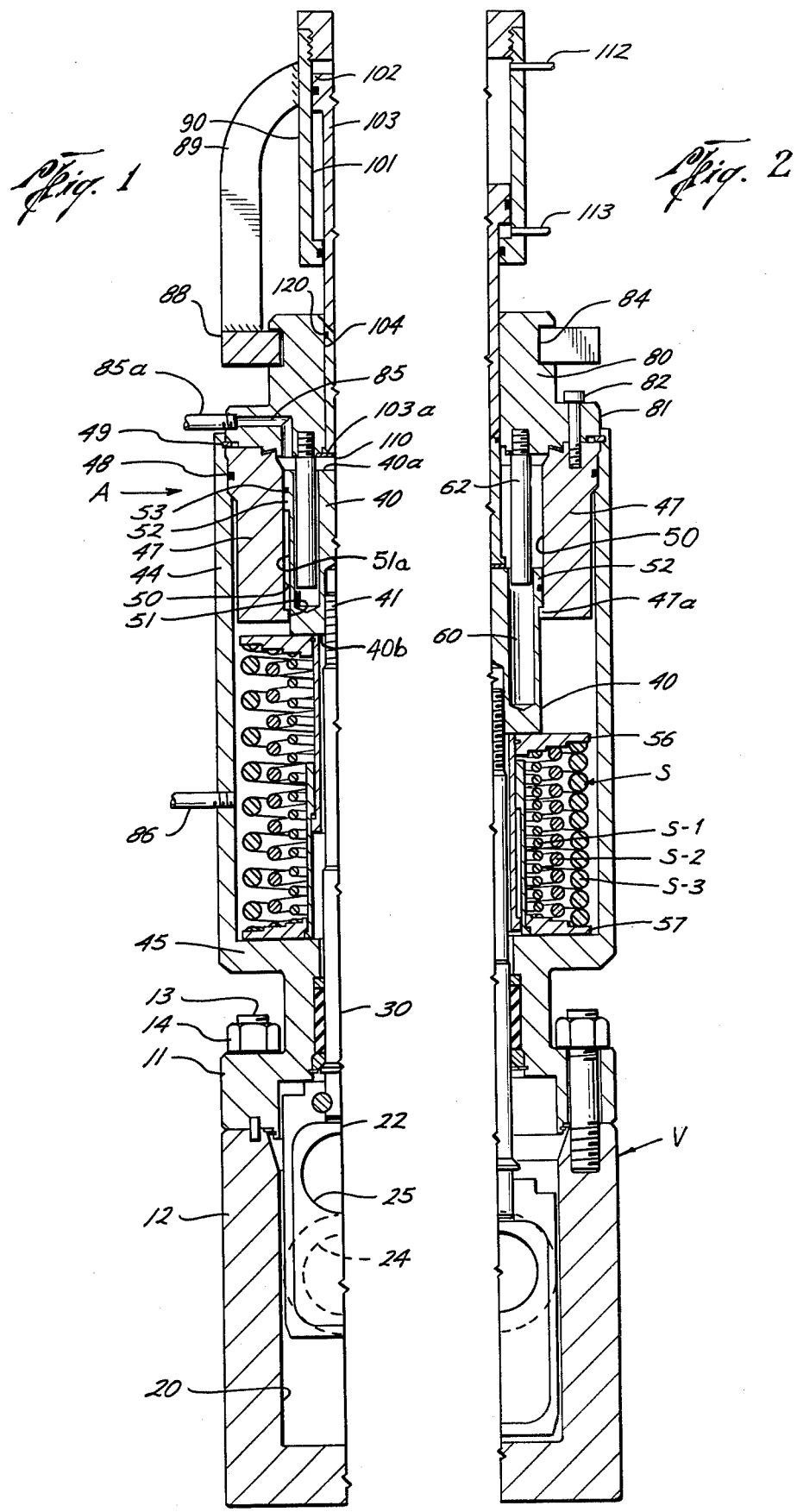

EMERGENCY OVERRIDE WITH HERMETIC SEAL

BACKGROUND OF THE INVENTION

As the offshore drilling and production industry moves into deeper waters, the need for subsea wellhead equipment, such as christmas trees and control valves, which can be operated remotely in depths beyond those at which divers can work becomes increasingly greater. Further, automatic or remotely actuated control valves such as are used on subsea wellheads require some means for manually or mechanically overriding the valve in the event the hydraulic actuator should fail to function properly. Additionally, it is desirable to have an override mechanism for moving the valve to the open position with a minimum number of seals to thereby enhance the inherent reliability of the system. It is therefore an object of the present invention to provide a new and improved gate valve with an emergency override having a hermetic seal to provide a means for overriding the valve and requiring a minimum number of seals to protect the override mechanism.

SUMMARY OF THE INVENTION

The present invention provides a manual override system for gate valves which is hermetically sealed and therefore suitable for installation subsea beyond normal diver depth. With this type of valve override, a hydraulically actuated drive piston may be positioned on the valve and actuated to override the valve control.

The present invention comprises a new and improved gate valve emergency override with a hermetic seal positioned at the upper end of the valve actuator for sealing the override mechanism without the use of a number of resilient seals.

DESCRIPTION OF THE DRAWINGS

FIG. 1 is a longitudinal view partly in section and partly in elevation showing the valve and actuator together with the hermetic seal in the unruptured position; and FIG. 2 is a longitudinal sectional view of the valve and actuator showing the seal ruptured by the remote control override device.

DESCRIPTION OF THE PREFERRED EMBODIMENT

As shown in FIG. 1 of the drawings, the hermetically sealed valve actuator of the present invention is designated generally A. The valve actuator includes a bonnet 11 which is bolted onto the valve body 12 by means of studs 13 and nuts 14. As shown, the valve body 12 includes a cavity 20 in which is slidably mounted the valve gate 22 which includes an opening 25 which when aligned with the bore indicated at 24 opens communication through the valve body. The lower part of the valve gate is solid and, when positioned in alignment with the passage 24, closes communication through the bore 24. The gate 22 is mounted on a stem 30, the upper end of which extends through the actuator A and terminates in a piston 40 to which such stem 30 is connected by means of threads 41.

As shown, the actuator A includes an outer cylindrical body 44 having an annular shoulder 45 at the lower end and having a piston cap 47 positioned in the upper end. Such cap 47 includes a seal 48 and is held in the cylindrical body 44 by means of a spring 49. Also, the cap 47 includes a bore 50 and a counterbore 51 for receving the piston 40. Such piston 40 comprises a cylindrical body 51a having an exterior annular shoulder 52 thereon. As shown in FIG. 2 of the drawings, the shoulder 52 engages the lower shoulder 47a in the cap 47 to limit the downward travel of the piston 40 relative to the cap 47. Further, the cylindrical piston 40 is provided with a plurality of circumferentially spaced bores 60 which receive the pins 62 that are threaded into the piston header 80.

As shown, the lower end 40b of the piston 40 engages the upper end plate 56 of the spring cartridge designated generally S. Such spring cartridge includes three concentrically mounted coil springs S-1, S-2 and S-3 which are positioned between the upper end plate 56 and the lower end plate 57. Such spring cartridge acts as a return spring to return the piston 40 to the upper position shown in FIG. 1.

The piston header 80 is a cylindrical cap which is provided with a lower flange 81 having a plurality of bolts or screws 82 for connecting the header 80 to the piston cap 47. Also, the piston head includes an annular groove 84 which extends around the header near the upper end for receiving the connecting plate 88 which is connected by means of yoke 89 to the override piston cylinder 90.

As shown, the cap 80 includes hydraulic fluid passage 85 which is connected to conduit 85a for introducing hydraulic fluid into the bore 50 in the cap 47 for moving the piston 40 axially downward of the valve actuator A. Also, as shown in FIG. 1 a fluid discharge conduit 86 is also provided in the cylindrical housing 44 for discharging the hydraulic fluid from such actuator.

The override piston cylinder 90 is a cylindrical housing having a bore 101 therein for receiving the piston 102 which is formed on the cylindrical body 103 which is inserted into the central passage 104 in the piston header 80. Also as shown in FIG. 1 of the drawings, the hermetic seal plate 110 is welded onto the bottom of the piston header 80 and extends across the central opening 104 so as to provide a seal across the bottom of that opening.

The override piston cylinder 90 is provided with a fluid inlet 112 and a fluid discharge 113 for actuating the piston 102 in such cylinder 90.

During operation of the gate valve emergency override of the present invention, should it become necessary, the override actuator cylinder 90 receives fluid through the passage 112 into the bore 101 to move the piston 102 downwardly to the position shown in FIG. 2 thus moving the cylindrical member 103 downwardly causing the lower end 103a to shear the metallic hermetic seal 110 to thereby allow such cylindrical member 103 to engage the top 40a of the piston 40, and as the member 103 continues moving downwardly, it moves the piston 40 downwardly and also the shaft or stem 30 attached thereto to move the gate 22 so as to align the opening 25 with the passage 24 and thereby open the valve V. As shown, the cylindrical member 103 is provided with an external O-ring seal 120 which engages the inner surface of the central opening 104 in the piston header 80 and thereby maintains a seal to prevent the incursion of sea water or other foreign matter into the valve actuator body A.

It will also be appreciated that in those instances when it is necessary to employ the emergency override apparatus of the present invention, it will normally require that the valve V and the actuator A will be subsequently removed to the surface for overhaul, service or replacement, as may be required. Also it will be appreciated that the emergency override device of the present invention will normally be used with a TV camera as a positioning aid. Further, it is also anticipated that in view of the likelihood of the need of a major overhaul of the valve, the dependence on the seal 120 will normally be of a short duration.

The foregoing disclosure and description of the invention are illustrative and explanatory thereof, and various changes in the size, shape and materials as well as in the details of the illustrated construction may be made without departing from the spirit and scope of the invention.

I claim:

1. In a hydraulically actuated gate valve including a hydraulic piston slidably mounted in a cylindrical body and connected to a valve stem for moving the stem and a valve gate mounted therewith for opening and closing the valve, the improvement comprising:
   (a) a hermetically sealed header secured to the upper end of said cylindrical body having a passage extending therethrough for receiving an override actuator piston for moving said hydraulic piston when its hydraulic piston system fails;
   (b) a rupturable hermetic seal means secured in said header passage for closing said passage to provide a hermetic seal to exclude moisture and foreign substances from said hydraulic piston and rupturable by said override actuator piston upon actuation of same.

2. The invention of claim 1, including additional seal means for sealing between said override actuator piston and the passage in said header.

3. The invention of claim 1, including an annular groove on said header for receiving a yoke for mounting the actuator piston on said header.

* * * * *